United States Patent
Lee et al.

(10) Patent No.: US 7,457,510 B2
(45) Date of Patent: Nov. 25, 2008

(54) LIGHT GUIDE MEMBER AND BACKLIGHT UNIT INCLUDING LIGHT GUIDE MEMBER

(75) Inventors: Dong Ho Lee, Ulsan-si (KR); Won Ki Cho, Yangsan-si (KR); Jae Myung Kim, Suwon-si (KR); Kyung Il Park, Seoul (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/727,053

(22) Filed: Mar. 23, 2007

(65) Prior Publication Data

US 2008/0025687 A1    Jan. 31, 2008

(30) Foreign Application Priority Data

Jul. 4, 2006    (KR) ............. 10-2006-0062735
Jul. 4, 2006    (KR) ............. 10-2006-0062736

(51) Int. Cl.
*G02B 6/10* (2006.01)
*F21V 8/00* (2006.01)

(52) U.S. Cl. ............... 385/146; 385/129; 362/612; 362/615

(58) Field of Classification Search ............ None
See application file for complete search history.

(56) References Cited

U.S. PATENT DOCUMENTS

| | | | |
|---|---|---|---|
| 5,598,280 A | 1/1997 | Nishio et al. | |
| 5,719,649 A | 2/1998 | Shono et al. | |
| 6,356,389 B1 | 3/2002 | Nilsen | |
| 6,364,497 B1 * | 4/2002 | Park et al. | 362/627 |
| 6,595,652 B2 | 7/2003 | Oda et al. | |
| 7,248,764 B2 | 7/2007 | Park et al. | |
| 2003/0227768 A1 * | 12/2003 | Hara et al. | 362/31 |
| 2004/0076396 A1 | 4/2004 | Suga | |
| 2004/0246697 A1 | 12/2004 | Yamashita et al. | |
| 2006/0018623 A1 | 1/2006 | Yu et al. | |
| 2006/0146227 A1 * | 7/2006 | Park et al. | 349/64 |

FOREIGN PATENT DOCUMENTS

| | | |
|---|---|---|
| EP | 0 588 504 | 3/1994 |
| JP | 2003-331624 | 11/2003 |
| JP | 2004-079418 | 3/2004 |
| KR | 10-2000-0024140 A | 5/2000 |
| KR | 10-2001-0035196 A | 5/2001 |
| KR | 10-2001-0106393 A | 11/2001 |
| KR | 10-2002-0023263 | 3/2002 |
| KR | 10-2002-0031566 A | 5/2002 |
| KR | 10-20020046962 A | 6/2002 |
| KR | 10-2002-0069380 A | 9/2002 |

(Continued)

*Primary Examiner*—Tina M Wong
(74) *Attorney, Agent, or Firm*—Lee & Morse, P.C.

(57) ABSTRACT

A light guide member for guiding light may include a first pattern on a first side of the light guide member, the first pattern may include a plurality of first features extending along a first direction, and a plurality of second features extending along a second direction, wherein the first direction crosses the second direction, the first feature has a first feature size, the second feature has a second feature size, and the first feature size may be less than the second feature size.

21 Claims, 9 Drawing Sheets

FOREIGN PATENT DOCUMENTS

| | | | |
|---|---|---|---|
| KR | 10-2004-0024725 A | 3/2004 |
| KR | 2005045187 | * | 5/2005 |
| KR | 10-2005-0057807 A | 6/2005 |
| KR | 10-2005-0079521 A | 8/2005 |
| KR | 10-2006-0024179 A | 3/2006 |
| WO | WO 97-30373 | 8/1997 |
| WO | WO 03-050448 | 6/2003 |

* cited by examiner

W/Sr IRRADIANCE deg ANGLE

LIGHT GUIDE MEMBER AND BACKLIGHT UNIT INCLUDING LIGHT GUIDE MEMBER

BACKGROUND OF THE INVENTION

1. Field of the Invention

The invention relates to a light guide member and a backlight unit including a light guide member. More particularly, the invention relates to a light guide member for guiding light traveling therein and providing uniformly distributed light, and a backlight unit employing such a light guide member.

2. Description of the Related Art

A light guide member may be employed, e.g., by an illumination device of a display device, to receive light from a light source of the illumination device and guide the received light so as to provide light having a uniform luminance distribution to a display panel of the display device. For example, a flat panel display device, e.g., a liquid crystal display (LCD), may include an illumination device, e.g., a backlight unit (BLU), which may include a light guide member.

There is a demand for improved display devices in, e.g., the information and communication industries. More particularly, e.g., higher resolution, lighter, thinner, and/or less power consuming display devices are desired. One possible approach for developing such improved display devices is to provide thinner, lighter BLUs and/or improved light guide members capable of providing light having a more uniform luminance distribution.

For example, one type of flat panel display that is widely used today is thin film transistor-liquid crystal displays (TFT-LCDs). Such TFT-LCDs may include a LCD panel in which liquid crystal is provided between two substrates, a BLU as an illumination device positioned in a lower portion of the LCD panel, and a LCD drive IC (LDI) for driving the LCD panel. The BLU unit may include, e.g., a light source, a light guide member, an optical sheet including a diffusion sheet and a prism sheet.

The light source may supply non-uniformly distributed linear light to the light guide member. Generally, the light guide member is to modify the non-uniformly distributed linear light and output planar light having a uniform optical distribution. However, conventional light guide members fall short of outputting uniformly distributed linear light. For example, portions of the light guide member arranged between and in close proximity to light sources of the illumination device may provide less light, i.e., appear darker, than portions of the light guide member arranged substantially along a zero-degree radiation angle of the respective light source.

More particularly, in general, as the radiation angle of light from the light source increases, light intensity decreases. The diffusion of light is also generally weak at a portion of a light guide member close to the light source. Thus, e.g., at portions of the light guide member receiving light from the light source via relatively larger radiation angles and/or beyond a radiation angle of the light, the intensity of light output from the light guide member may not have a uniform luminance distribution. As a result of such non-uniformity a luminance distribution of light from the light guide member may include a bright line, bright area and/or dark area close to the light source, i.e., a bright line/area effect. Such a bright line/area effect may be particularly prominent at portions of the light guide member that do not overlap with or are not aligned with light sources of a light source unit. When light having a non-uniform luminance distribution is provided to a display device, image quality of the display device may be hindered.

In view of such shortcomings of the light guide member, a BLU employing such light guide members may include a plurality of optical sheets, e.g., a diffusion sheet and a prism sheet, in an attempt to provide light having a more uniformly distributed luminance to the display device. However, having to provide additional optical sheets may increase, e.g., the cost, weight and/or size of the BLU.

SUMMARY OF THE INVENTION

It is an object of the invention to provide a light guide member and a backlight unit including such a light guide member, which substantially overcome one or more of the problems due to limitations and disadvantages of the related art.

It is therefore a feature of embodiments of the invention to provide a light guide member capable of guiding light to output light having a more uniform luminance distribution relative to conventional light guide members.

It is therefore a separate feature of embodiments of the invention to provide a light guide employable and/or a backlight unit that improves the luminance and uniformity of light by providing substantially V-shaped or triangular-shaped grooves on the light guide member in a predetermined pattern.

It is therefore a separate feature of embodiments of the invention to provide a light guide member including a plurality of grooves and/or projections capable of concentrating light incident thereon, and preventing and/or reducing spreading of light, thereby enabling improving and/or increasing the uniformity of a luminance distribution of light provided by the light guide member.

It is therefore a separate feature of embodiments of the invention to provide a light guide member including a plurality of types of grooves and/or projections, wherein at least one-type of the grooves and/or projections may have pitch that decreases, approaching away from the light source so as to reduce deviation of light incident thereon.

It is therefore a separate feature of embodiments of the invention to provide a light guide member including a dot-like pattern on one area of one side of the light guide member close to a light source so as to reduce and/or prevent a bright line/area(s) and/or dark area(s) at portions of the light guide member close to the light source, thereby improving a luminance distribution of the light from the light guide member.

At least one of the above and other features and advantages of the invention may be realized by providing a light guide member a light guide member for guiding light, the light guide member including a first pattern on a first side of the light guide member, the first pattern including a plurality of first features extending along a first direction, and a plurality of second features extending along a second direction, wherein the first direction crosses the second direction, the first feature has a first feature size, the second feature has a second feature size, and the first feature size is less than the second feature size.

The light guide member may include a second side including a plurality of third features extending along a third direction. The third features may include at least one of a plurality of third grooves and a plurality of third projections. The first features may include at least one of a plurality of first grooves having a first depth and a plurality of first projections having a first height, and the second features may include at least one of a plurality of second grooves having a second depth and a plurality of second projections having a second height. The first pattern may include a plurality of the first grooves and a plurality of the second grooves, and the first grooves and the second grooves may have a substantially V-like cross-sectional shape, taken along a direction crossing the first direction or the second direction, respectively. The first depth may be about one-half to about one-quarter of the second depth. The first height may be about one-half to about one-quarter of the second height. A first angle formed by two inner sides of the second grooves may be about 140° to about 170°. A first angle formed by two inner sides of the second projections may be about 140° to about 170°.

A second angle formed by an inner side of one of the second grooves and a plane substantially parallel to a plane along which the light guide member extends may be about 1.3° to about 2.3°. A second angle formed by an inner side of one of the second projections and a plane substantially parallel to a plane along which the light guide member extends may be about 1.3° to about 2.3°. The first grooves may have a first pitch and the second grooves have a second pitch, and the second pitch may be larger than the first pitch. The first projections may have a first pitch and the second projections may have a second pitch, and the second pitch may be larger than the first pitch. The second pitch may be about 0.003 mm to about 0.3 mm. The light guide member may include a second pattern on the first side of the light guide member, the second pattern may include a plurality of dot-like patterns the first pattern may be formed on a first area of the first side of the light guide member and the second pattern may be formed on a second area of the first side of the light guide member, the first area may be different from the second area. The second area may be about 2% to about 4% of an entire area of the first side. A diameter of the dot-like patterns may be about 40 μm to about 50 μm. The dot-like patterns may be engraved patterns formed on the second area of the first side. The dot-like patterns may be projections formed on the second area of the first side.

At least one of the above and other features of the invention may be separately realized by providing a backlight unit (BLU) employable by a display device including a display panel, the BLU may include a light guide member for guiding light incident thereon, the light guide member including a first pattern on a first side of the light guide member, the first pattern including a plurality of first features extending along a first direction, and a plurality of second features extending along a second direction, wherein the first direction crosses the second direction, the first feature has a first feature size, the second feature has a second feature size, and the first feature size is less than the second feature size.

The BLU may include a light source and the light guide member may include a second side with a second pattern formed thereon, the second pattern may include a plurality of dot-like patterns, the first pattern may be formed on a first area of the first side of the light guide member and the second pattern may be formed on a second area of the first side of the light guide member, the first area may be different from the second area, and the second area may be closer to the light source than the first area. The BLU may include a light source and the first direction may be parallel to a zero-degree radiation angle of light from the light source, and the second direction may be substantially perpendicular to the first direction.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1A:
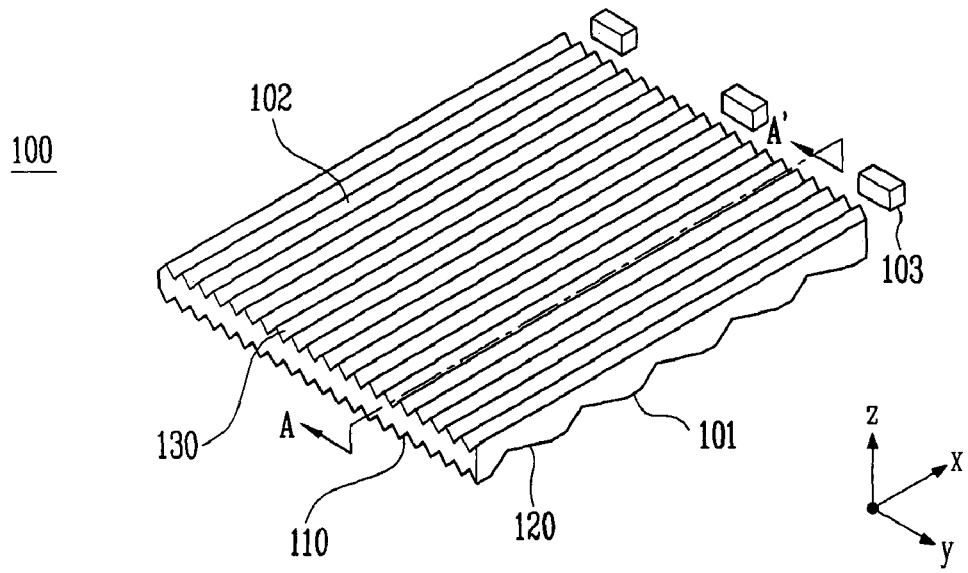
FIG. 1A illustrates a top-side perspective view of a first exemplary embodiment of a light guide member employing one or more aspects of the invention.

Korean Patent Application Nos. 2006-0062735 and 2006-0062736, filed on Jul. 4, 2006, in the Korean Intellectual Property Office, and entitled: "Light guide member and Backlight Unit Having the Same," the disclosure of which is incorporated herein by reference.

The invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout. In the following description, references made to "first," "second," etc. merely serve to identify different elements and/or features of different elements and, unless specified otherwise, the features may or may not have the same values.

Hereinafter, a light guide member of a backlight unit according to an embodiment of the invention is described with reference to the accompanying drawings.

Figure 1B:
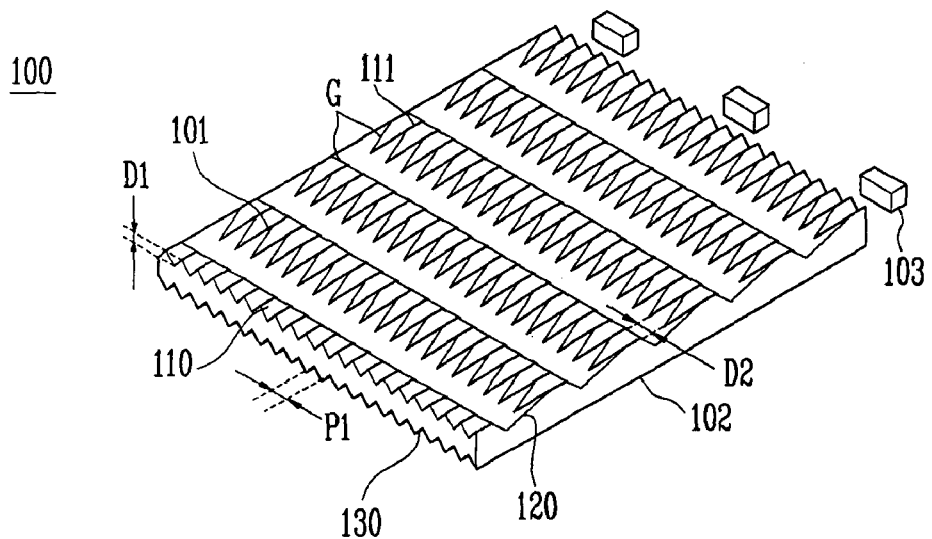
FIG. 1B illustrates a bottom-side perspective view of the exemplary light guide member illustrated in FIG. 1A.
Figure 1C:
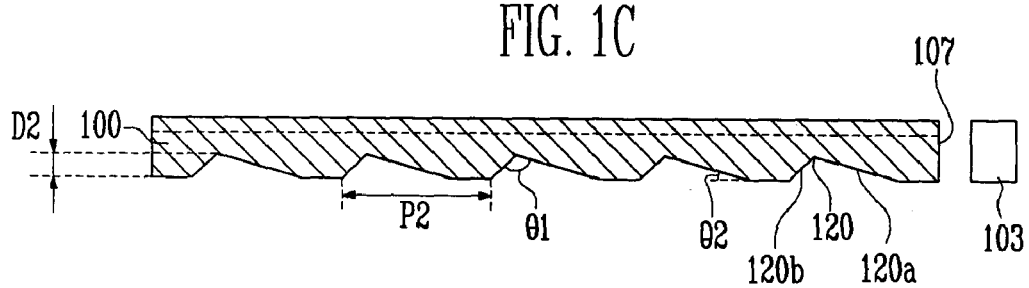
FIG. 1C illustrates a cross-sectional view of the exemplary light guide member illustrated in FIG. 1A, taken along line A-A' of FIG. 1A.

FIG. 1A illustrates a top-side perspective view of a first exemplary embodiment of a light guide member employing one or more aspects of the invention, FIG. 1B illustrates a bottom-side perspective view of the exemplary light guide member illustrated in FIG. 1A, and FIG. 1C illustrates a cross-sectional view of the exemplary light guide member illustrated in FIG. 1A, taken along line A-A' of FIG. 1A.

With reference to FIGS. 1A to 1C, a light guide member 100 may include a first side 101 and a second side 102. Light incident on the light guide member 100 may be reflected from the first side 101 and/or prevented from exiting the light guide member 100 via the first side 101. Light guided by the light guide member 100 may exit the light guide member 100 via the second side 102. Each of the first side 101 and/or the second side 102 may be patterned. In embodiments of the invention, one or more sides of the light guide member 100 may be patterned with feature(s) such as projections, indentations, and combinations of projections and indentations, etc. In embodiments of the invention, at least one side of the light guide member 131 may include first features having a first size and second features having a second size, wherein the first feature size may be different from e.g., less than, the second feature size. As discussed below, the feature size may correspond, e.g., to a depth of a groove, a height of a projection, a pitch of a groove, a pitch of a projection, etc. As discussed below, in embodiments of the invention, at least one first feature size may be different from the corresponding second feature size.

The patterns may be, e.g., engraved on the sides, e.g., first side 101, second side 102. One exemplary pattern may include a plurality of first grooves 110 and a plurality of second grooves 120. The first grooves 110 and/or the second grooves 120 may have a substantially V-shape or triangular shape. The first grooves 110 may extend along a first direction, e.g., x-direction, and the second grooves 120 may extend along a second direction, e.g., y-direction. The first direction, e.g., x-direction may cross, e.g., extend perpendicularly to, the second direction, e.g., y-direction. In embodiments of the invention, this pattern including the first grooves 110 and the second grooves 120 may be formed on, e.g., the first side 101 of the light guide member 100. Although the exemplary embodiment illustrated in FIGS. 1A and 1B illustrate this pattern including the first grooves 110 and the second grooves 120 formed on the first side 101 of the light guide member, embodiments of the invention are not limited to such a structure. In embodiments of the invention, the pattern including the first grooves 110 and the second grooves 120 may be formed, e.g., on the second side 102 of the light guide member 100.

The first grooves 110 may help concentrate light and help reduce and/or prevent light from spreading side to side within the light guide member 100. The first grooves 110 may have a first depth D1. The second grooves 120 may help control an exit angle of the light exiting from the second side 102. The second grooves 120 may have a second depth D2. The first depth D1 may be less that the second depth D2. In embodiments of the invention, the second depth D2 may be about two times 2× to about four times 4× deeper than the first depth D1.

In embodiments of the invention, gaps G may exist between the first grooves 110 along the first direction, e.g., the x-direction. That is, the first grooves 110 may not continuously extend entirely across the light guide member 100 along, e.g., the x-direction. Along the second direction, e.g., the y-direction, adjacent ones of the first grooves 110 may be connected and may share a common edge 111. In embodiments of the invention, the second grooves 120 may continuously extend across the light guide member 100 along, e.g., the y-direction. In embodiments of the invention, a plurality of the first grooves 110 may be formed on each, some or one of the second grooves 120. For example, in embodiments of the invention, each, some or one of the second grooves 120 may have a serrated-type edge as a result of the first grooves 110. In embodiments of the invention, each of the first grooves 110 may be associated with only one of the second grooves 120, while one of the second grooves 120 may be associated with a plurality of the first grooves 110.

As discussed above, the second grooves 120 may have a-shape. A first angle θ1 between inner sides 120a, 120b of the second groove 120 may be about 140° to about 170°. A second angle θ2 between the inner side 120a and a plane extending along the first and second directions, e.g., x-y plane, may be about 1.3° to about 2.3°. The inner side 120a may correspond to the inner side of the second groove 120 closer to a third side 107 of the light guide member, which may face the light source 103. The second angle θ2 may correspond to the angle of an edge of the substantially triangular shape that is closest to a light source 103. In embodiments of the invention, the light guide member 100 may extend substantially parallel to the plane extending along the first and second directions.

The angles described above, e.g., may be varied so as to control an exit angle (not shown) of light exiting from the second side 102. In embodiments of the invention, the first grooves 110 and/or the second grooves 120 may be formed with, e.g., the angle values described above, which may enable the exit angle (not shown) of light exiting from the second side 102 to be adjusted/controlled such that the exit angle of the light may be about 65° to about 75°. The exit angle may correspond to an angle of the light relative to a plane extending along the first and second directions, e.g., x-y direction. In general, e.g., the angles may have various values. The angles may be set at predetermined values so as to control and/or adjust the exit angle of the light exiting from the second side 102.

Referring to FIGS. 1B and 1C, the first grooves 110 may be arranged at a first pitch P1. The second grooves 120 may be arranged at a second pitch P2. The second pitch P2 may be larger than the first pitch P1. In embodiments of the invention, the second pitch P2 may be larger than a distance along which the first grooves 110 extend along the first direction, e.g., x-direction. In embodiments of the invention, the second pitch P2 may be about 0.003 mm to about 0.3 mm. The first pitch P1 and/or the second pitch P2 may be adjusted based on, e.g., a pixel pitch of a display panel (not shown) of a display device (not shown). More particularly, Moire effects may be reduced and/or prevented by adjusting the first pitch P1 and/or the second pitch P2 according to the pixel pitch of the display device. In embodiments of the invention, the second pitch P2 of the second grooves 120 may decrease approaching away from the light source 103, i.e. approaching away from the third side 107 of the light guide member 100. In embodiments of the invention, the second pitch P2 of the second groove 120 may remain constant across the light guide member 100. Each of the second grooves 120 may be arranged at a respective predetermined interval.

Another exemplary pattern may include a plurality of third grooves 130. The third grooves 130 may extend substantially parallel to the first grooves 110 and may extend along the first direction, e.g., x-direction. The first grooves 110 may extend substantially parallel to the third grooves 130. The third grooves 230 may have a substantially V-shaped cross-section. In embodiments of the invention, this pattern of the third grooves 130 may be formed on, e.g., the second side 102 of the light guide member 100. Although the exemplary embodiment illustrated in FIGS. 1A and 1B illustrate this pattern including the third grooves 130 formed on the second side 102 of the light guide member, embodiments of the invention are not limited to such a structure. In embodiments of the invention, the pattern including the third grooves 130 may be formed, e.g., on the first side 101 of the light guide member 100.

In embodiments of the invention, the x-direction may correspond to a zero-degree radiation angle of the light radiated from the light source 103, and the third grooves 130 may extend parallel to the zero-degree radiation angle of the light from the light source 103. The third grooves 130 may help adjust and/or control the exit angle (not shown) of light exiting from the second side 102.

More particularly, in the exemplary embodiment illustrated in FIGS. 1A to 1C, the third grooves 130 extend along a same direction as the zero-degree radiation angle of the light radiated from the light source 103, the first grooves 110 extend along a same direction as the third grooves 130, and the second grooves 120 extend along the second direction, e.g., perpendicular to the first direction. One or more aspects of the invention are not limited to such a structure and persons of ordinary skill in the art may modify, e.g., such directions of the first, second and/or third grooves 110, 120, 130. In embodiments of the invention, the first, second and/or third grooves may be repeatedly arranged across entire respective sides, e.g., 101, 102, of the light guide member 100.

Figure 2A:
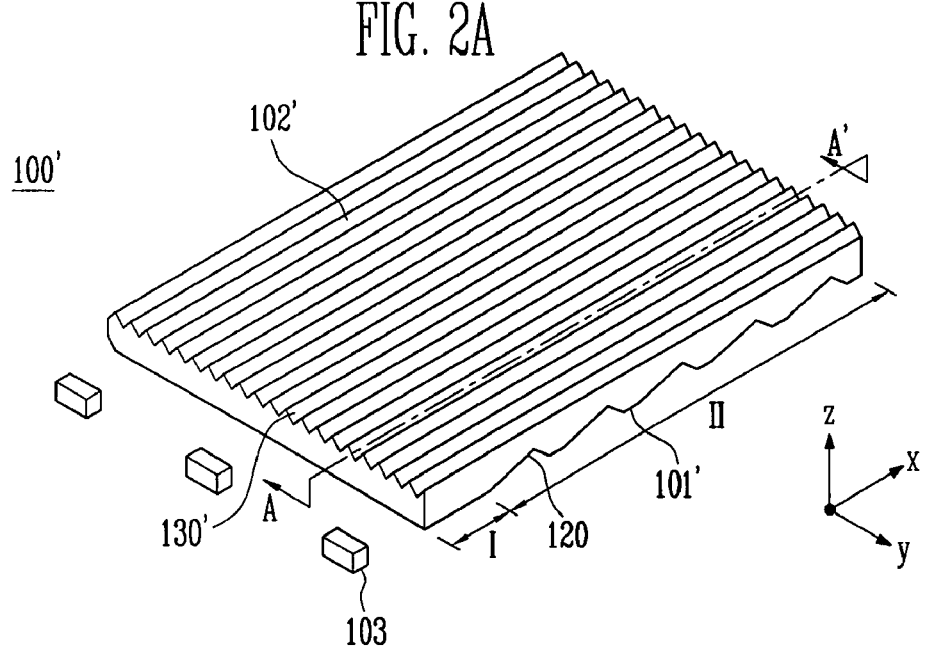
FIG. 2A illustrates a top-side perspective view of a second exemplary embodiment of a light guide member employing one or more aspects of the invention.
Figure 2B:
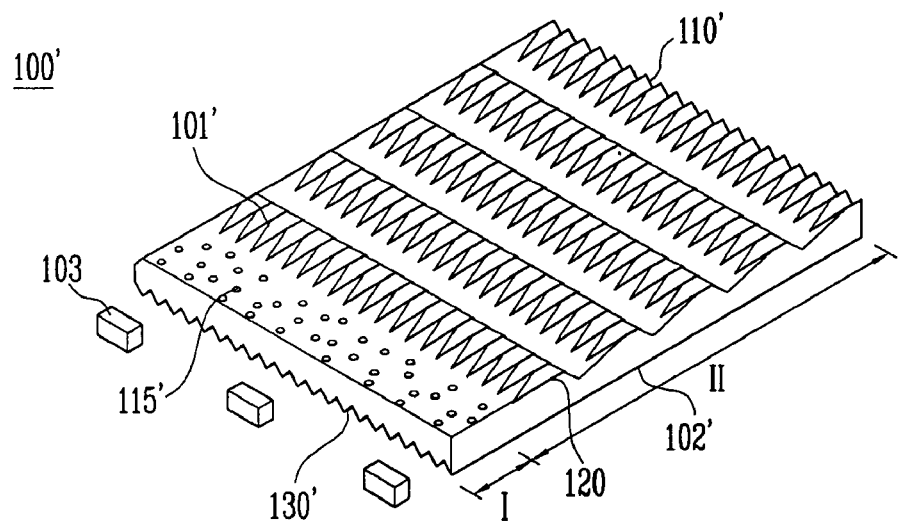
FIG. 2B illustrates a bottom-side view of the exemplary light guide member illustrated in FIG. 2A.
Figure 2C:
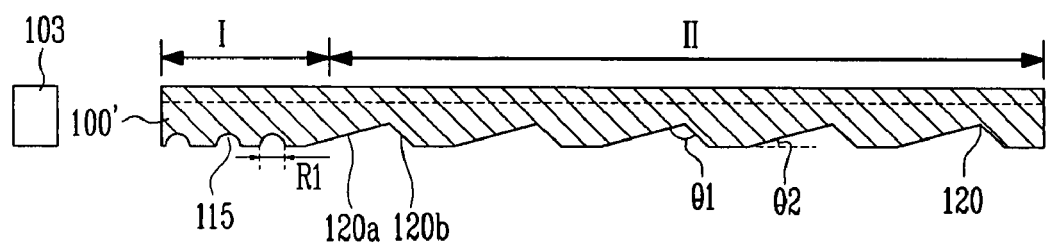
FIG. 2C illustrates a cross-sectional view of the exemplary light guide member illustrated in FIG. 2A, taken along line A-A' of FIG. 2A.

FIG. 2A illustrates a top-side perspective view of a second exemplary embodiment of a light guide member employing one or more aspects of the invention, FIG. 2B illustrates a bottom-side view of the exemplary light guide member illustrated in FIG. 2A, and FIG. 2C illustrates a cross sectional view of the exemplary light guide member illustrated in FIG. 2A, taken along line A-A' of FIG. 2A. In the description of alternative embodiments below, only differences between the respective embodiment and the first exemplary embodiment described above with reference to FIGS. 1A to 1C will be described in detail.

With reference to FIGS. 2A to 2C, a light guide member 100' may include a first side 101' and a second side 102'. The first side 101' may reflect light and/or prevent light from exiting from the first side 101' of the light guide member 100'. Light guided by the light guide member 100' may exit the light guide member 100' via the second side 102'. Various patterns may be formed on the first side 101' and/or the second side 102'.

In the exemplary embodiment illustrated in FIGS. 2A to 2C, the first side 101' of the light guide member 100' may include a first area I and a second area II. The first area I may correspond to a portion of the first side 101' close to the light source 103. For example, the first area I may correspond to an end portion of the first side 101' close to the light source 103. The second area II may correspond to a remaining portion of the first side 101'. In embodiments of the invention, the first area 1 may correspond to about 2% to about 4% of the first side 101' of the light guide member 100'.

Different patterns may be formed on the first area I and the second area II. For example, as illustrated in FIG. 2B, a dotted pattern may be formed on the first area 1 and a grooved pattern may be formed on the second area II. The dotted pattern may include a plurality of dot-like projections and/or indentations.

In the exemplary embodiment illustrated in FIGS. 2A to 2C, the first area I may include a plurality of dot-like indentations 115. The plurality of dot-like indentations 115 may be randomly arranged, e.g., without a specific order, on the first side 101'. The plurality of dot-like indentations 115 may change an angle of light emitted from the light source 103 to a predetermined angle and/or may help to initially diffuse the light from the light source 103. The changed light may then be further changed by the pattern formed on the second area II before exiting from the light guide member 100' via, e.g., the second side 102'. In the following description, unless specified otherwise, features of the dot-like indentations 115 may apply to dot-like projections.

By providing dot-like indentation(s) 115 on the first area I, light may be better diffused in the first area 1, and a bright area/line effect at portions of the light guide member 100' may be reduced and/or eliminated. Thus, a distribution of the light exiting the light guide member 100' may be more uniform and/or completely uniform, and visibility of a display employing such a light guide panel may be improved.

A diameter R1 of the dot-like indentations 115 may be, e.g., about 40 μm to about 50 μm. Embodiments of the invention are not limited to such diameters, however, it may be difficult to process and/or fabricate dot-like indentations 115 with diameters R1 less than about 40 μm, and on the other hand, excessively increasing the diameter R1 of the dot-like indentations 115 beyond about 50 μm may reduce a number of the dot-like indentations 115 on the first side 101' of the light guide member 100', which may reduce the uniformity of the light provided by the light guide member 100'.

In embodiments of the invention, the light guide member 100' may be injection-molded and, e.g., engraved with a laser to form the dot-like indentations 115. In embodiments of the invention, the pattern formed on the first area 1 may be changed based on a shape(s) of the dot-like indentations 115. In embodiments of the invention, the dot-like indentations 115 may have various shapes, e.g., hemi-spherical, hemi-oval, etc.

The second area II of the first side 101 of the light guide member 100' may include, e.g., a plurality of the first grooves 110 and a plurality of the second grooves 120. The second side 102' of the light guide member 100' may include, e.g., a plurality of the third grooves 130. The first grooves 110, the second grooves 120 and the third grooves 130 may have one, some or all the features of those elements described above with reference to the exemplary embodiment illustrated in FIGS. 1A to 1C.

Figure 3A:
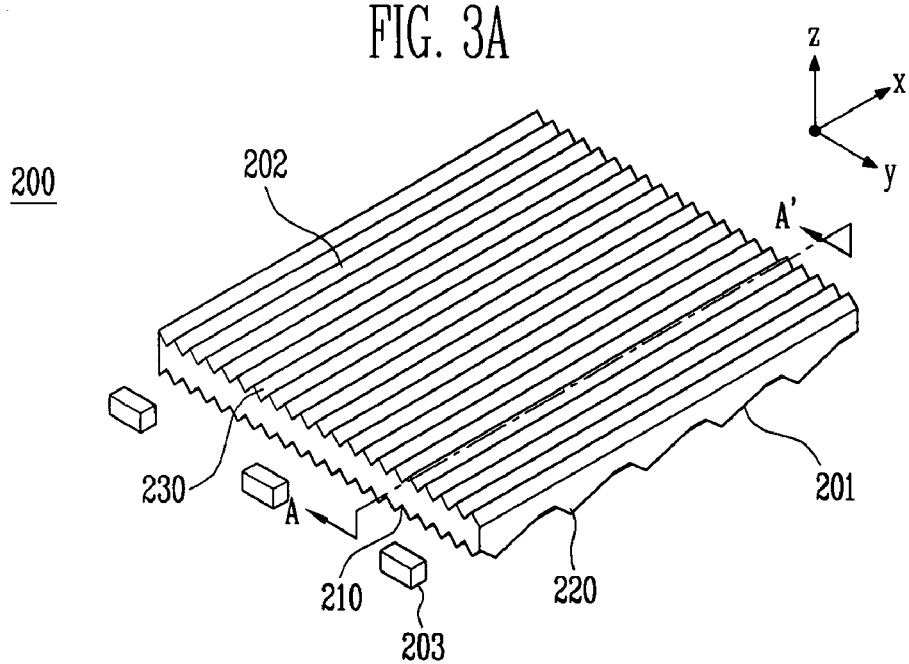
FIG. 3A illustrates a top-side perspective view of a third exemplary embodiment of a light guide member employing one or more aspects of the invention.
Figure 3B:
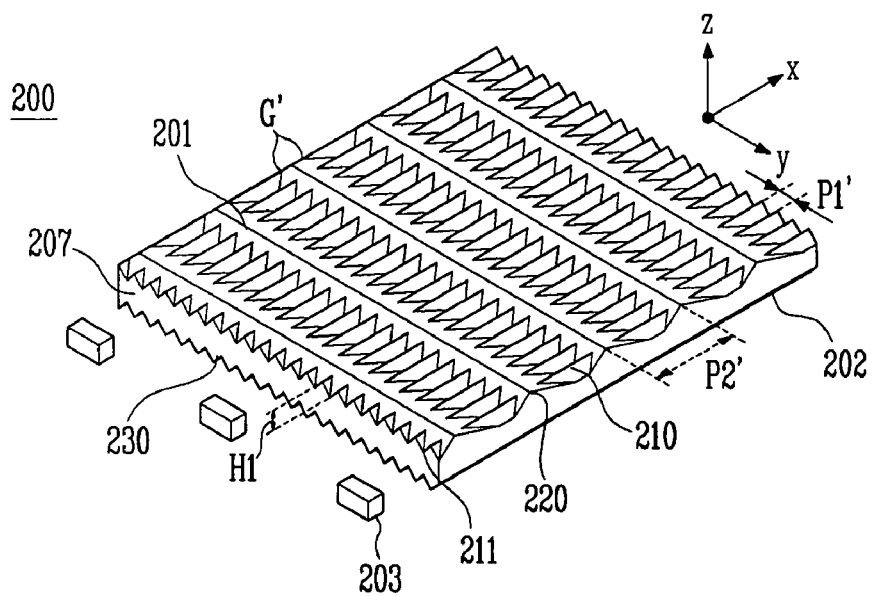
FIG. 3B illustrates a bottom-side perspective view of the exemplary light guide member illustrated in FIG. 3A.
Figure 3C:
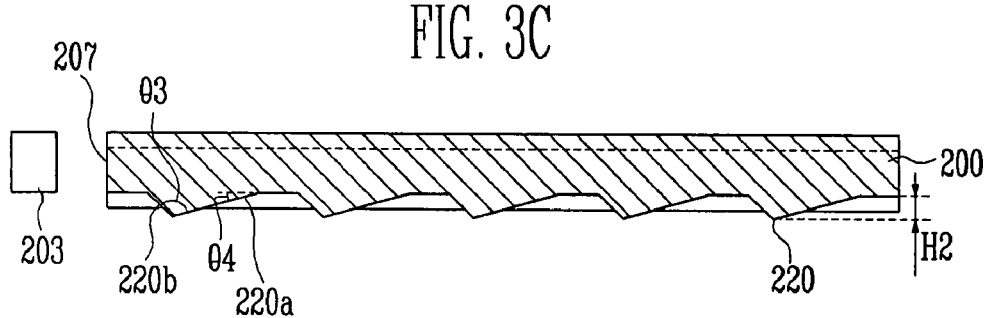
FIG. 3C illustrates a cross-sectional view of the exemplary light guide member illustrated in FIG. 3A, taken along line A-A' of FIG. 3A.

FIG. 3A illustrates a top-side perspective view of a third exemplary embodiment of a light guide member employing one or more aspects of the invention, FIG. 3B illustrates a bottom-side perspective view of the exemplary light guide member illustrated in FIG. 3A, and FIG. 3C illustrates a cross sectional view of the exemplary light guide member illustrated in FIG. 3A, taken along line A-A' of FIG. 3A.

With reference to FIGS. 3A to 3C, a light guide member 200 may include a first side 201 and a second side 202. Light incident on the light guide member 200 may be reflected from the first side 201 and/or prevented from exiting the light guide member 200 via the first side 201. Light guided by the light guide member 200 may exit the light guide member 200 via the second side 202. Each of the first side 201 and/or the second side 202 may be patterned.

The patterns may be formed, e.g., by depositing or arranging a material(s) on the first and/or second surfaces of the light guide member 200 to form an embossed pattern or projection. The third exemplary embodiment illustrated in FIGS. 3A to 3C may substantially correspond to an inverse of the first exemplary embodiment of the invention illustrated in FIGS. 1A to 1C, so as to include projections instead of grooves. One exemplary pattern may include a plurality of first projections 210 and a plurality of second projections 220. The first projections 210 and/or the second projections 220 may have a substantially V-shaped or triangular shaped cross-section. The first projections 210 may extend along a first direction, e.g., x-direction, and the second projections 220 may extend along a second direction, e.g., y-direction. The first direction, e.g., x-direction, may cross, e.g., extend perpendicularly to, the second direction, e.g., y-direction. In embodiments of the invention, this pattern including the first projections 210 and the second projections 220 may be formed on, e.g., the first side 201 of the light guide member 200.

The first projections 210 may define grooves that may help concentrate light and help reduce and/or prevent light from spreading side to side within the light guide member 200. The first projections 210 may have a first height H1. The second projections may help control an exit angle of the light exiting from the second side 202. The second projections 220 may have a second height H2. The first height H1 may be less than the second height H2. In embodiments of the invention, the second height H2 may be about two times 2× to about four times 4× higher than the first height H1. The first projections 210 may be formed on inner sides 220a, 220b of the second projections 220. In embodiments of the invention, a plurality of the first projections 210 may be formed in each, some or one of the second projections 220. For example, in embodiments of the invention, a space between the inner sides 220a, 220b of the second projections 220 may be partially divided into a plurality of V-shapes or triangular shapes as a result of the first projections 210. In embodiments of the invention, each of the first projections 210 may be associated with only one of the second projections 220, while one of the second projections 220 may be associated with a plurality of the first projections 210.

In embodiments of the invention, gaps G' may exist between the first projections 210 along the first direction, e.g., the x-direction. That is, the first projections 210 may not continuously extend entirely across the light guide member 200 along, e.g., the x-direction. Along the second direction, e.g., the y-direction, adjacent ones of the first projections 210 may be connected and may share a common edge 211. In embodiments of the invention, the second projections 220 may continuously extend across the light guide member 200 along, e.g., the y-direction.

As discussed above, the second projections 220 may have a V-shaped or triangular-shaped cross-section. A first angle θ3 between the inner sides 220a, 220b of the first projections 210 may be about 140° to about 170°. A second angle θ4 between the inner side 220b and a plane extending along the first and second directions, e.g., x-y plane, may be about 1.3° to about 2.3°. The inner side 220b may be farther from the light source 203 that the other inner side 220a. The second angle θ4 may correspond to the angle of an edge of the substantially triangular cross-sectional shape that is farthest from a light source 203 and/or a third side 207 of the light guide member 200. In embodiments of the invention, the light guide member 200 may extend substantially parallel to the plane extending along the first and second directions.

The angles described above, e.g., may be varied so as to control an exit angle (not shown) of light exiting from the second side 202. In embodiments of the invention, the first projections 210 and/or the second projections 220 may be formed with, e.g., the angle values described above, which may enable the exit angle (not shown) of light exiting from the second side 202 to be adjusted/controlled such that the exit angle of the light may be about 65° to about 75°. The exit angle may correspond to an angle of the light relative to a plane extending along the first and second directions, e.g., x-y plane. In general, e.g., the angles may have various values. The angles may be set at predetermined values to help control and/or adjust the exit angle of the light exiting from the second side 202.

The first projections 210 may be arranged at a first pitch P1'. The second projections 220 may be arranged at a second pitch P2'. The second pitch P2' may be larger than the first pitch P1'. In embodiments of the invention, the second pitch P2' may be about 0.003 mm to about 0.3 mm. The first pitch P2' and/or the second pitch P2' may be adjusted based on, e.g., a pixel pitch of the display panel (not shown) of the display device (not shown). More particularly, Moire effects may be reduced and/or prevented by adjusting the first pitch P1' and/or the second pitch P2' according to the pixel pitch of the display device. In embodiments of the invention, the second pitch P2' of the second projections 220 may decrease approaching away from the light source 203, i.e., approaching away from third side 207 of the light guide member 200. By decreasing the second pitch P2', e.g., deviation of light radiated thereon may be reduced. In embodiments of the invention, the second pitch P2' of the second projections 220 may remain constant across the light guide member 200. Each of the second projections 220 may be arranged at a respective predetermined interval.

Another exemplary pattern may include a plurality of third projections 230. The third projections 230 may extend substantially parallel to the first projections 210 and may extend along the first direction, e.g., x-direction. The third projections 230 may project from the second side 202 of the light guide member 200 and may correspond to an inverse structure of the third grooves 130 described above with reference to FIGS. 1A to 2C. The first projections 210 may extend substantially parallel to the third grooves 230. The third projections 230 may have a substantially V-shaped or triangular-shaped cross-section. In embodiments of the invention, this pattern of the third grooves 230 may be formed on, e.g., the second side 202 of the light guide member 200.

In embodiments of the invention, the x-direction may correspond to a zero-degree radiation angle of the light radiated from the light source 203, and the first projections 210 and/or the third projections 230 may extend parallel to the zero-degree radiation angle of the light from the light source. The third projections 230 may help adjust and/or control the exit angle (not shown) of light exiting from the second side 202.

More particularly, in the exemplary embodiment illustrated in FIGS. 3A to 3C, the third projections 230 extend along a same direction as the zero-degree radiation angle of the light radiated from the light source 203, the first projections 210 extend along the same direction as the third projections 230, and the second projections 220 extend along the second direction, e.g., perpendicular to the first direction. One or more aspects of the invention are not limited to such a structure, and persons of ordinary skill in the art may modify, e.g., such directions of the first, second and/or third projections 210, 220, 230. In embodiments of the invention, the first, second and/or third projections 210, 220, 230 may be repeatedly arranged across entire respective sides, e.g., 201, 202, of the light guide member 200.

Figure 4A:
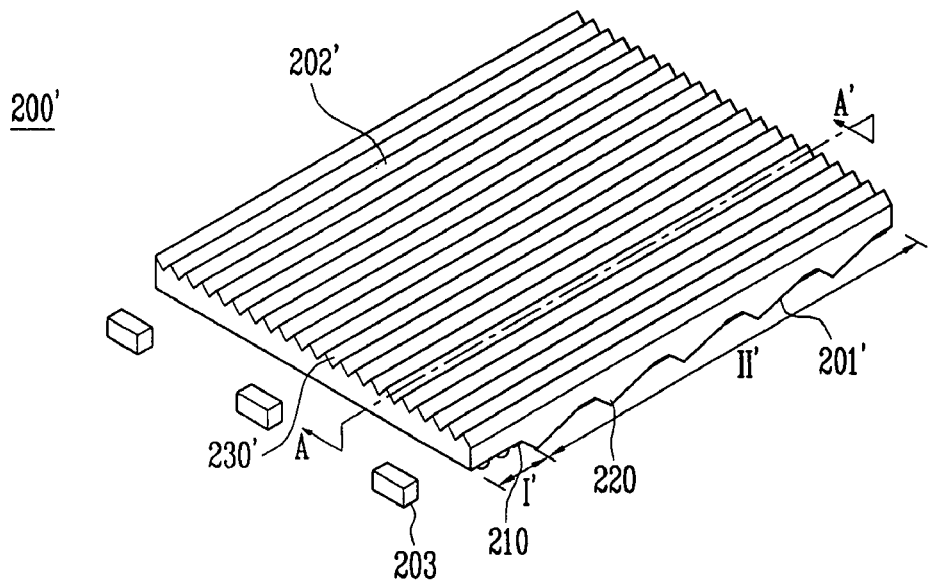
FIG. 4A illustrates a perspective view of a fourth exemplary embodiment of a light guide member employing one or more aspects of the invention.
Figure 4B:
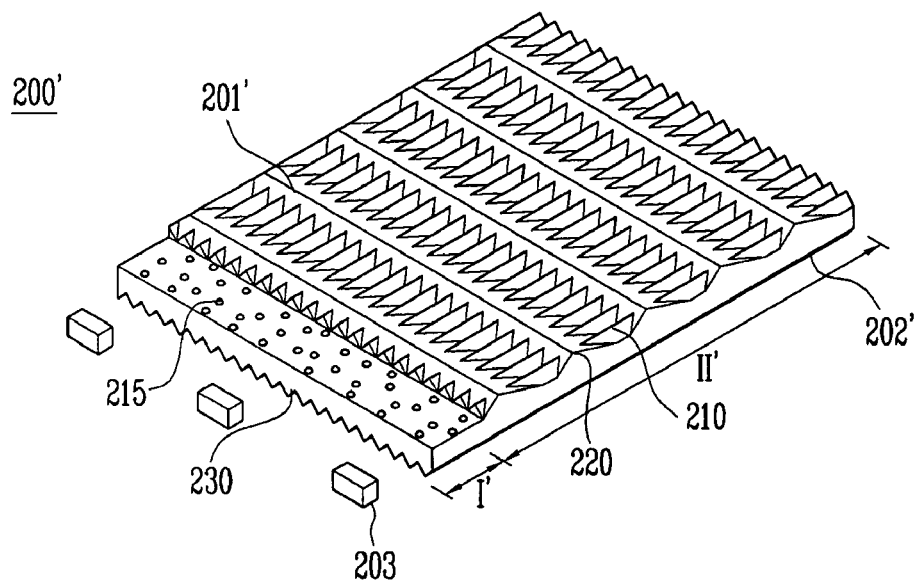
FIG. 4B illustrates a bottom-side view of the exemplary light guide member illustrated in FIG. 4A.
Figure 4C:
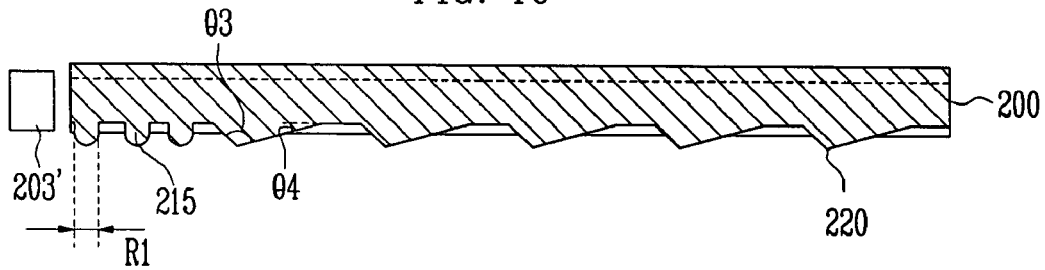
FIG. 4C illustrates a cross-sectional view of the exemplary light guide member illustrated in FIG. 4A, taken along line A-A' of FIG. 4A.

FIG. 4A illustrates a perspective view of a fourth exemplary embodiment of a light guide member employing one or more aspects of the invention, FIG. 4B illustrates a bottom-side view of the exemplary light guide member illustrated in FIG. 4A, and FIG. 4C illustrates a cross sectional view of the exemplary light guide member illustrated in FIG. 4A, taken along line A-A' of FIG. 4A. In the description of alternative embodiments below, only differences between the respective embodiment and the first exemplary embodiment described above with reference to FIGS. 1A to 1C will be described in detail.

With reference to FIGS. 4A to 4C, a light guide member 200' may include a first side 201' and a second side 202'. The first side 201' may reflect light and/or prevent light from exiting from the first side 201' of the light guide member 200'. Light guided by the light guide member 200' may exit the light guide member 200' via the second side 202'.

In the exemplary embodiment illustrated in FIGS. 4A to 4C, the first side 201' of the light guide member 200' may include a first area I' and a second area II'. The first area I' may correspond to a portion of the first side 201' close to the light source 203. The second area II' may correspond to a remaining portion of the first side 201'. In embodiments of the invention, the first area I' may correspond to about 2% to about 4% of the first side 201' of the light guide member 200'.

Different patterns may be formed on the first area I' and the second area II'. For example, as illustrated in FIG. 4B, a dotted pattern may be formed on the first area 1' and a grooved pattern may be formed on the second area II'. The dotted pattern may include a plurality of dot-like projections and/or indentations.

In the exemplary embodiment illustrated in FIGS. 4A-4C, the first area I' may include a plurality of dot-like projections 215. The plurality of dot-like projections 215 may be randomly arranged, e.g., without specific order, on the first side 201'. The plurality of dot-like projections 215 may change an angle of light emitted from the light source 203 to a predetermined angle and/or may help to initially diffuse the light from the light source 203. The changed light may then be further changed by the pattern formed on the second area II' before exiting from the light guide member 200' via, e.g., the second side 202'. In the following description, unless specified otherwise, features of the dot-like projections 215 may apply to dot-like indentations.

By providing dot-like projection(s) 215 on the first area I', a bright area/line effect at portions of the light guide member 200' may be reduced and/or eliminated, and distribution of the light exiting the light guide member 200' may be more uniform and/or more completely uniform.

A diameter R1' of the dot-like projections 215 may be, e.g., about 40 μm to about 50 μm. Embodiments of the invention are not limited to such diameters, however, it may be difficult to process and/or fabricate dot-like indentations 115 with diameters R1' less than about 40 μm, and on the other hand, excessively increasing the diameter R1' of the dot-like projections 215 beyond about 50 μm may reduce a number of the dot-like projections 215 on the first side 101' of the light guide member 100', which may reduce the uniformity of the light provided by the light guide member 100'.

In embodiments of the invention, the pattern formed on the first area 1' may be changed based on a shape(s) of the dot-like projections 215. In embodiments of the invention, the dot-like projections 215 may have various shapes, e.g., hemispherical, hemi-oval, etc.

The second area II' of the first side 201 of the light guide member 200' may include, e.g., a plurality of the first projections 210 and a plurality of the second projections 220. The second side 202' of the light guide member 200' may include, e.g., a plurality of the third projections 230. The first projections 210, the second projections 220 and the third projections 230 and/or the angles may have one, some or all the features of those elements described above with reference to the exemplary embodiment illustrated in FIGS. 3A to 3C.

An exemplary operation of a light guide member employing one or more aspects of the invention is described below. As described above the first and second exemplary embodiments described above with reference to FIGS. 1A to 2C are essentially inverses of the third and fourth exemplary embodiments described above with regard to FIGS. 3A to 4C, respectively. For simplicity, a brief description of the exemplary operation of the exemplary embodiments illustrated in FIGS. 3A to 4C will be provided. However, persons skilled in the art appreciate that the operation of the first and the second exemplary embodiments may be the same as that of the third and the fourth exemplary embodiments.

Figure 5A:
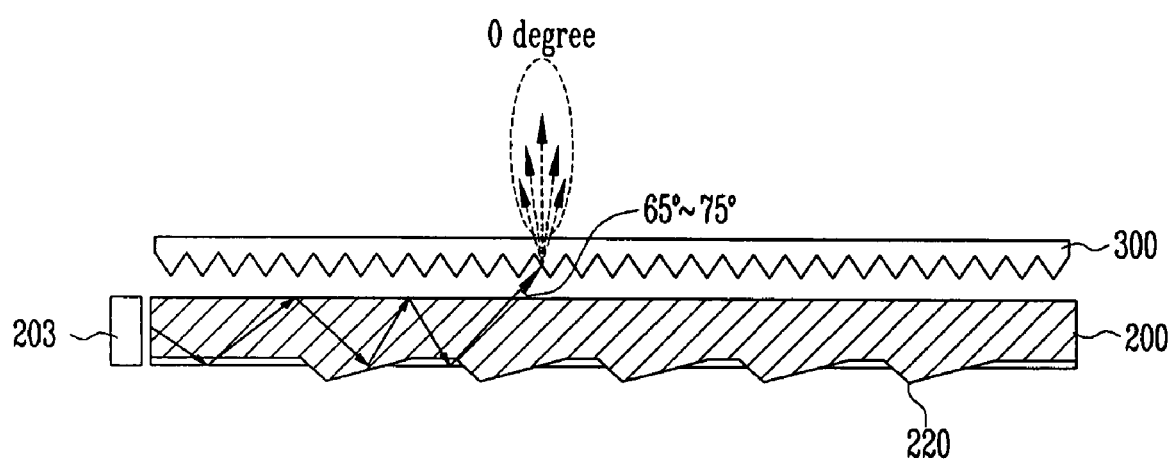
FIGS. 5A and 5B illustrate partial cross-sectional views of an exemplary light guide member, light source and are explanatory views illustrating the operation of third and fourth exemplary embodiments of the invention, respectively.
Figure 5B:
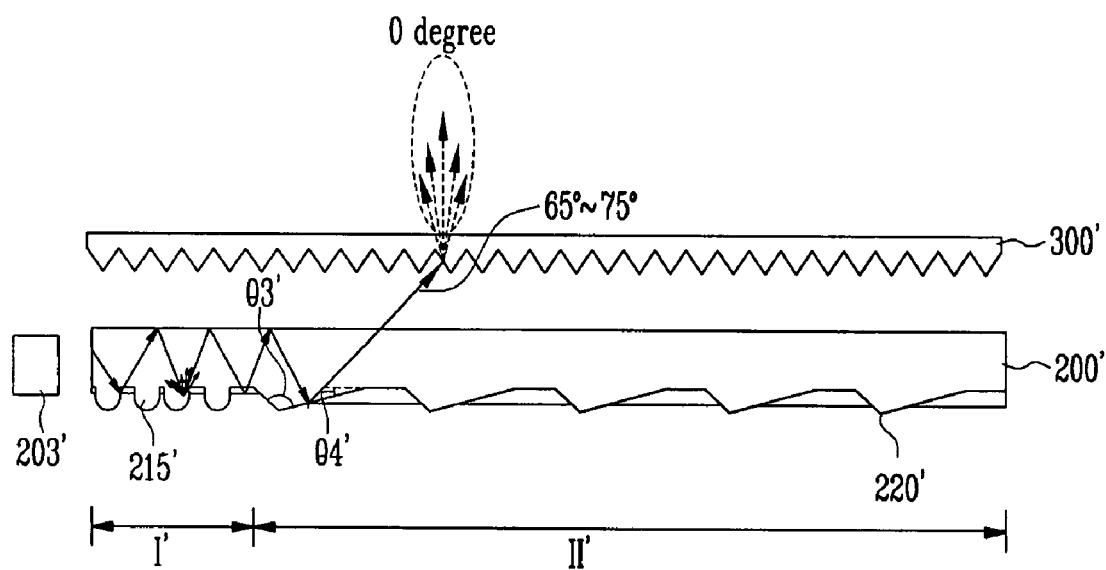

FIGS. 5A and 5B illustrate partial cross sectional views of an exemplary light guide member, light source and are explanatory views illustrating the operation of the third and fourth exemplary embodiments of the invention, respectively.

Referring to FIG. 5A, light may be emitted from the light source 203 toward the light guide member 200. The light from the light source 203 may then be guided and provided to, e.g., a display panel of a display device via the light guide member 200.

The light irradiated from the light source 203 may be reflected by the second projections 220 at a predetermined angle. The exit angle of the light exiting the second side 202 of the light guide member 200 may be maintained at an angle of, or between, about 65° to about 75°. The light exiting the light guide member 200 may be provided to an inverse-prism sheet 300. The light may then exit the inverse-prism sheet 300 at an angle of about or exactly 0°.

The first projections 210 may prevent and/or reduce the light from spreading and may concentrate the light received by each of the first projections 210 so as to help increase the uniformity of the light and/or reduce the bright area/line effect and/or darkness at, e.g., a portion of the light guide member 200 close to the light source 203.

With reference to FIG. 5B, light may be emitted to the light guide member 200'. The light incident on the light guide member 200' may be diffused by the pattern on the first area I' of the light guide member 200'. For example, the light incident on the light guide member 200' may be diffused by the dot-like projections 215 on the first side 201' of the light guide member 200'. The diffused light may then be reflected by the second projections 220' at a predetermined angle, and an exit angle of the light exiting the second side 202' of the light guide member 200' may be maintained at an angle of, or between, about 65° to about 75°. The light exiting the light guide member 200' may be provided to the inverse-prism sheet 300, and the light may exit the inverse-prism sheet 300. The light may then exit the inverse-prism sheet 300 at an angle of about or exactly 0° relative to a third direction, e.g., z-direction. The third direction may extend substantially perpendicular to the first and second directions.

Figure 6A:
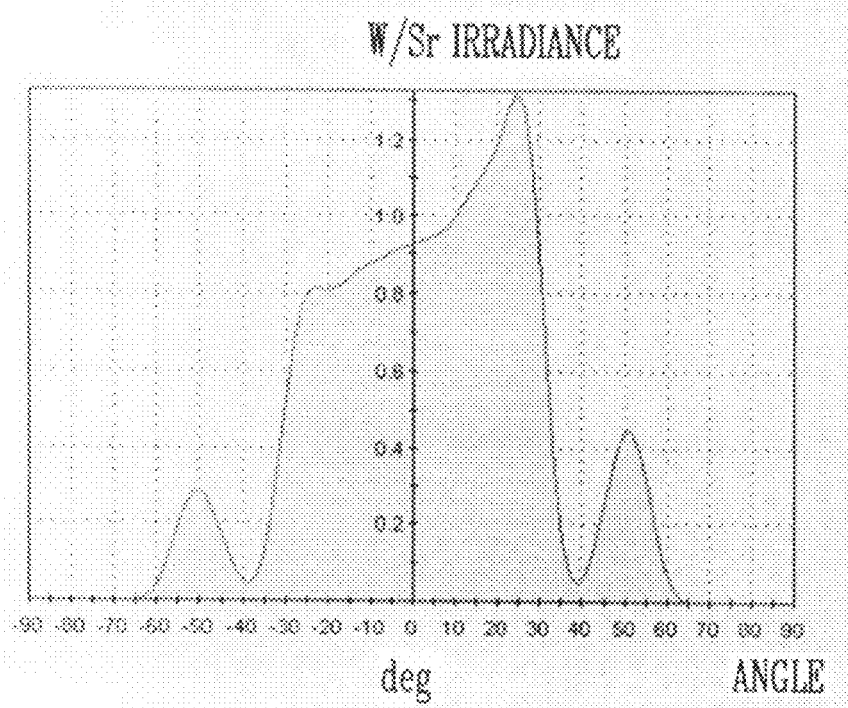
FIGS. 6A and 6B illustrate a graph of luminance of light exiting a conventional light guide member at various exit angles and a photograph of corresponding simulation results, respectively.
Figure 6B:
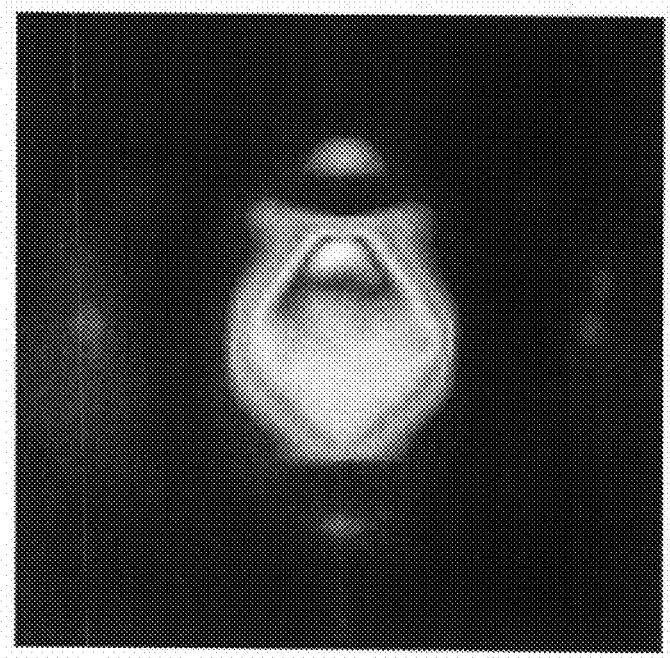
Figure 7A:
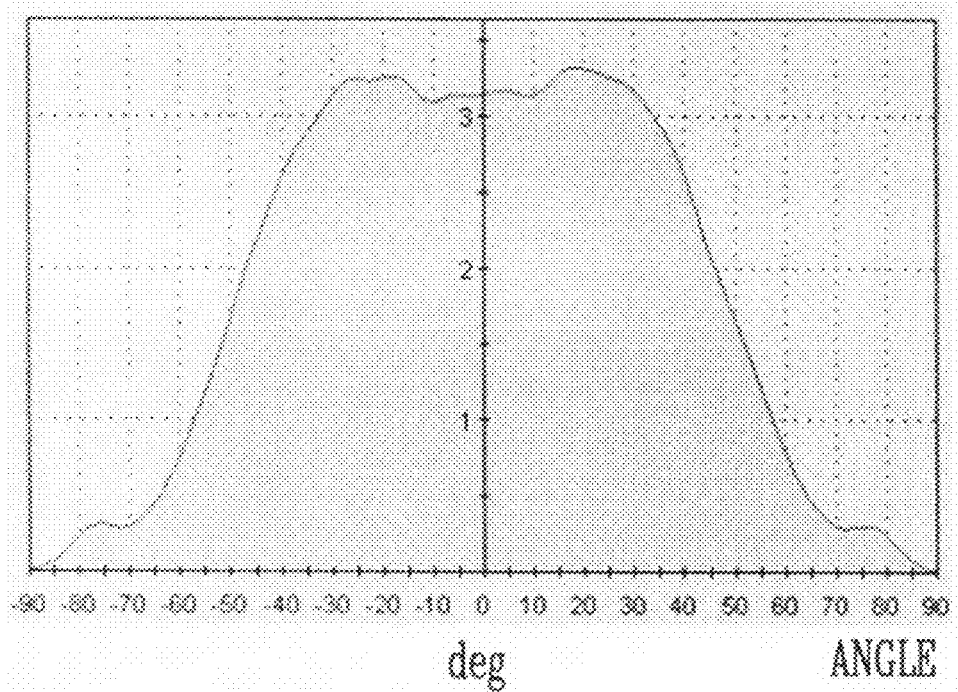
FIGS. 7A and 7B illustrate a graph of luminance of light exiting a light guide member employing one or more aspects of the invention at various exit angles and a photograph of corresponding simulation results, respectively.
Figure 7B:

FIGS. 6A and 6B illustrate a graph of luminance of light exiting a conventional light guide member at various exit angles and a photograph of corresponding simulation results, respectively. FIGS. 7A and 7B illustrate a graph of luminance of light exiting a light guide member employing one or more aspects of the invention at various exit angles and a photograph of corresponding simulation results, respectively.

With reference to FIGS. 6A and 6B, light incident on the conventional light guide member spreads and thus, the luminance is degraded. With reference to FIGS. 6A to 7B, light incident on the exemplary light guide member employing one or more aspects of the invention, e.g., 100, 100', 200, 200', may be concentrated and/or spreading of the incident light may be reduced and/or prevented such that luminance may be improved.

Figure 8A:
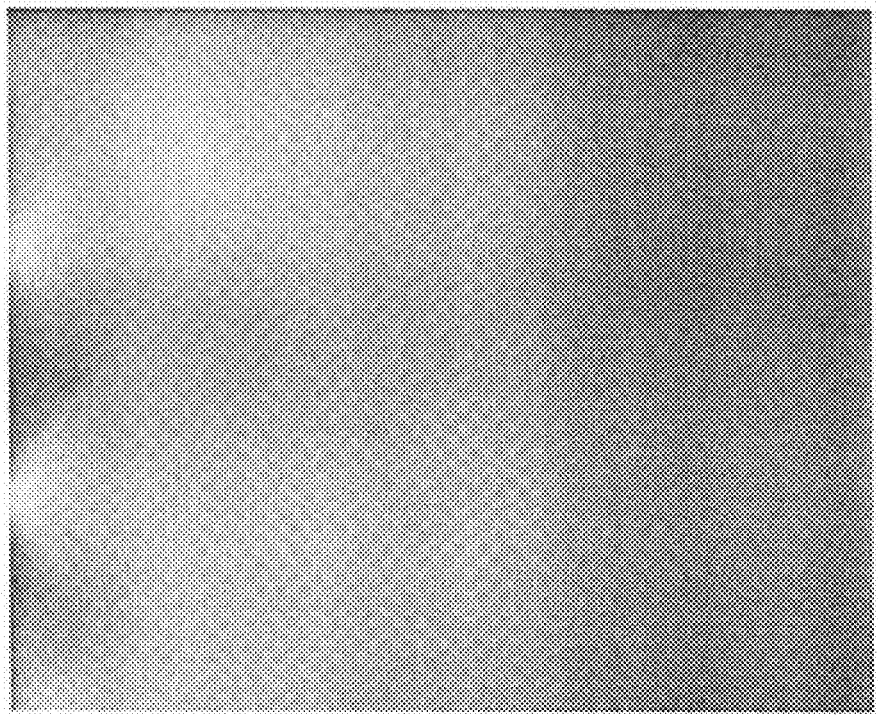
FIGS. 8A and 8B illustrate photographs of a light emitting state of a conventional light guide member and a light emitting state of a light guide member employing one or more aspects of the invention, respectively.
Figure 8B:
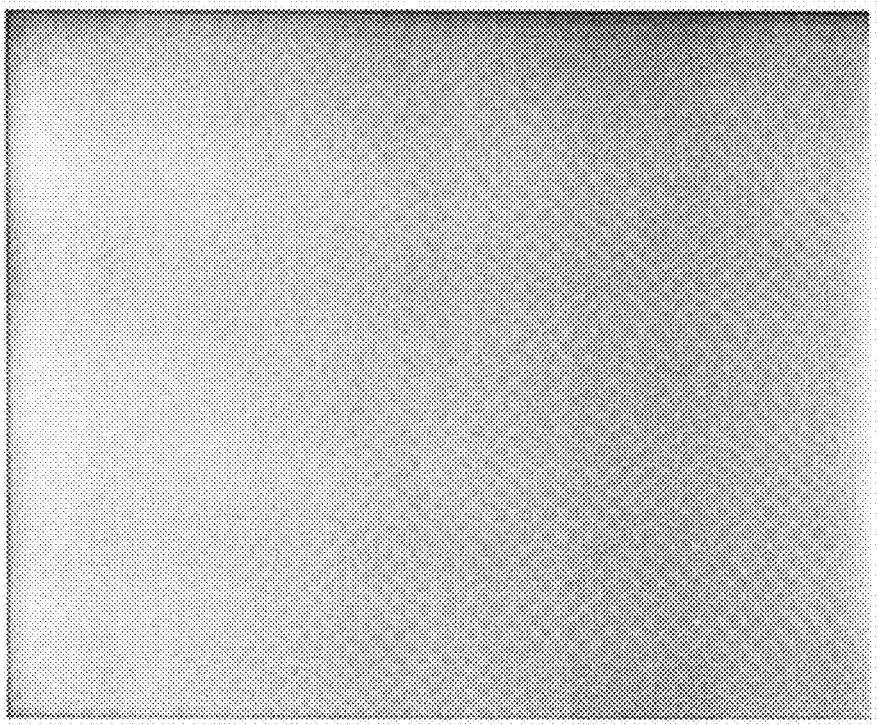

FIGS. 8A and 8B illustrate photographs of a light emitting state of a conventional light guide member and a light emitting state of a light guide member employing one or more aspects of the invention, respectively. With reference to FIG. 8A, a bright area/line/portion may be seen on the photograph, shown in FIG. 8A, obtained from a conventional light guide member. With reference to FIG. 8B, a bright area/line may not be visible and high and/or substantially uniform and/or completely uniform luminance may be observed from the light guide member employing one or more aspects of the invention. Thus, in light guide members employing one or more aspects of the invention, the bright area/line effect may be reduced and/or prevented. The photograph illustrated in FIG. 8B was obtained from a light guide member employing one or more aspects of the invention, and more particularly, including, e.g., the dot-like indentations 115 and/or the dot-like projections 215 along with the first, second and third grooves, e.g., 110, 120, 130, 210, 220, 230.

A light guide member employing one or more aspects of the invention may be manufactured using, e.g., injection molding. The light guide member can be made by forming an inversely-shaped-pattern on a mold core. Methods of forming light guide members including projections, e.g., dot-like projections, the first, second and/or third projections, e.g., the exemplary embodiments illustrated in FIGS. 3A to 4C may be easier than methods of forming light guide members including grooves and/or indentations, e.g., the exemplary embodiments illustrated in FIGS. 1A to 2C. More particularly, e.g., methods of forming the light guide member including projections, e.g., the exemplary embodiments illustrated in FIGS. 3A to 4C, may involve making a mold core including, e.g., V-shaped grooves using a diamond bite. Methods of forming the light guide members illustrated in FIGS. 1A to 2C may involve forming projections corresponding to shapes of the first, second and third grooves. Because it may e relatively difficult to form such projections directly, methods of forming the light guide members illustrated in FIGS. 1A to 2C may involve injection molding.

Figure 9:
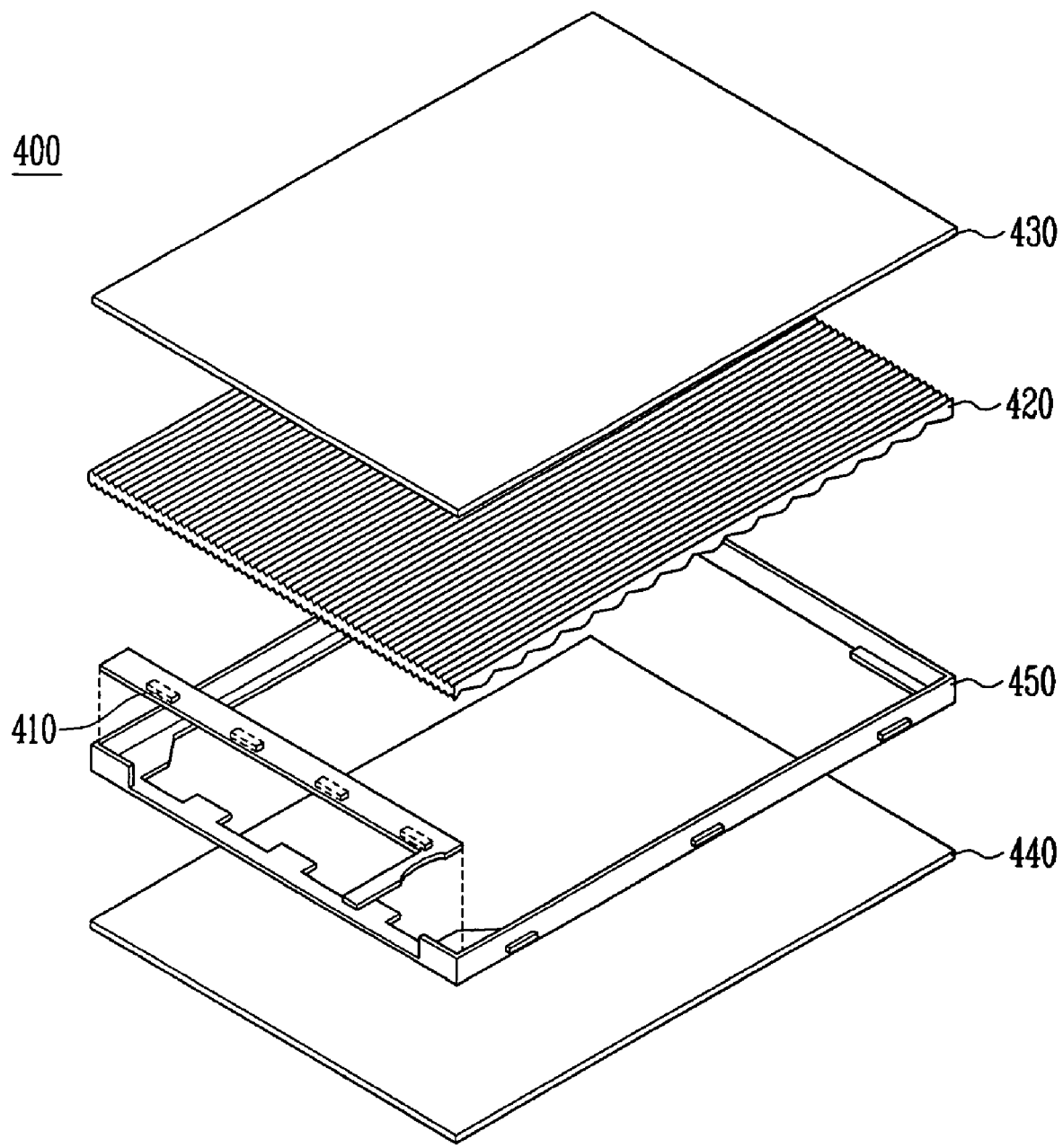
FIG. 9 illustrates an exploded perspective view of an exemplary backlight unit employing a light guide member according to one or more aspects of the invention.

The backlight unit provided with the light guide member will be described according to the above-described embodiment. FIG. 9 is an exploded perspective view of a backlight unit according to an embodiment of the invention.

FIG. 9 illustrates an exploded perspective view of an exemplary backlight unit employing a light guide member according to one or more aspects of the invention.

With reference to FIG. 9, a backlight unit 400 may include a light source 410, a light guide member 420, an optical member 430, and a reflective member 420. The light source 410 may emit light to the light guide member 420. The light guide member 420 may change a distribution of the light provided from the light source 410. The optical member 430 may include, e.g., a prism sheet, for making the distribution of the luminance uniform and/or improving a normal or vertical incident angle of the light. In embodiments of the invention, the optical member 430 may not include a diffusion sheet and/or may only include a prism sheet. The reflective member 440 may reflects the light emitted thereto back towards the light guide member 420. As illustrated in FIG. 9, the light guide member 420 may be supported by a mold frame 450.

The light guide member 420 may employ one or more aspects of the invention described above and may, e.g., correspond to any of the exemplary embodiments described in relation to FIGS. 1A to 4C. The light guide member 430 may include, e.g., projections, indentations and/or grooves on one or more sides thereof. The light guide member 430 may include, e.g., a transparent material(s) in which the projections, grooves and/or indentations may be formed. For example, the light guide member 430 may include, e.g., acrylic resins and may have a general shape of a plate-like member, e.g., a rectangular parallelepiped or cuboid shape. As described above, embodiments of the light guide member 430 may include areas having different types of patterns, e.g., dot-like projections and/or indentations, grooves, projections, etc. on one or more sides thereof.

Although exemplary embodiments of the light guide member and the backlight unit may be described in relation to an exemplary LCD device, embodiments of the invention are not limited to use with an LCD device. Further, although reference is made to a "backlight unit" as an exemplary illumination device, such units are generally called "backlight" units because they may be arranged behind the display panel. However, aspects of the invention are not limited to such arrangements and/or uses.

Aspects of the invention are described with reference to the exemplary embodiments illustrated in the accompanying Figures, however, modifications and variations thereof may be made without departing from the spirit and scope of the invention. For example, an angle, a depth, and/or a width of the pattern may be changed. Furthermore, persons skilled in the art appreciate that the various modifications and changes of the constitution of a backlight unit may include any embodiment of a light guide member employing one or more aspects of the invention.

Exemplary embodiments of the invention have been disclosed herein, and although specific terms are employed, they are used and are to be interpreted in a generic and descriptive sense only and not for purpose of limitation. For example, while V-grooves have been illustrated in embodiments of the invention, characteristics of the first grooves/projections, e.g., depth, height, etc, in relation to the second grooves/projections may be more important to than the shape of the groove itself. While a V-groove may be the most efficient manner to realize the patterns, the grooves may be curved, and/or have a flat base, rather than have a V-shape. Accordingly, it will be understood by those of ordinary skill in the art that various changes in form and details may be made without departing from the spirit and scope of the invention as set forth in the following claims.

What is claimed is:

1. A light guide member for guiding light, the light guide member comprising:
   a first pattern on a first side of the light guide member, the first pattern including:
   a plurality of first features extending along a first direction; and a plurality of second features extending along a second direction, wherein:

the first direction crosses the second direction, the first feature has a first feature size, the second feature has a second feature size, and the first feature size is less than the second feature size, and each of the first features extends from a first side of a respective one of the second features to one of a second side of the respective one of the second features and a first side of another one of the second features.

2. The light guide member as claimed in claim 1, further comprising a second side including a plurality of third features extending along a third direction.

3. The light guide member as claimed in claim 2, wherein the third features include at least one of a plurality of third grooves and a plurality of third projections.

4. The light guide member as claimed in claim 1, wherein the first features include at least one of a plurality of first grooves having a first depth and a plurality of first projections having a first height, and the second features include at least one of a plurality of second grooves having a second depth and a plurality of second projections having a second height.

5. The light guide member as claimed in claim 4, wherein the first pattern includes a plurality of the first grooves and a plurality of the second grooves, and the first grooves and the second grooves have a substantially V-like cross-sectional shape, taken along a direction crossing the first direction or the second direction, respectively.

6. The light guide member as claimed in claim 4, wherein the first pattern includes a plurality of the first grooves and a plurality of the second grooves, and the first depth is about one-half to about one-quarter of the second depth.

7. The light guide member as claimed in claim 4, wherein the first pattern includes a plurality of the first projections and a plurality of the second projections, the first height is about one-half to about one-quarter of the second height.

8. The light guide member as claimed in claim 4, wherein the first pattern includes a plurality of the first grooves and a plurality of the second grooves, and a first angle formed by the first and second sides of each of the second grooves is about 140° to about 170°.

9. The light guide member as claimed in claim 4, wherein the first pattern includes a plurality of the first projections and a plurality of the second projections, and a first angle formed by the first and second sides of each of the second projections is about 140° to about 170°.

10. The light guide member as claimed in claim 4, wherein the first pattern includes a plurality of the first grooves and a plurality of the second grooves, and a second angle formed by the first side of each of the second grooves and a plane substantially parallel to a plane along which the light guide member extends is about 1.3° to about 2.3°.

11. The light guide member as claimed in claim 4, wherein the first pattern includes a plurality of the first projections and a plurality of the second projections, and a second angle formed by the first side of each of the second projections and a plane substantially parallel to a plane along which the light guide member extends is about 1.3° to about 2.3°.

12. The light guide member as claimed in claim 4, wherein the first pattern includes a plurality of the first grooves and a plurality of the second grooves, and the first grooves have a first pitch and the second grooves have a second pitch, the second pitch being larger than the first pitch.

13. The light guide member as claimed in claim 12, wherein the second pitch is about 0.003 mm to about 0.3 mm.

14. The light guide member as claimed in claim 4, wherein the first pattern includes a plurality of the first projections and a plurality of the second projections, and the first projections have a first pitch and the second projections have a second pitch, the second pitch being larger than the first pitch.

15. The light guide member as claimed in claim 14, wherein the second pitch is about 0.003 mm to about 0.3 mm.

16. The light guide member as claimed in claim 1, further comprising a second pattern on the first side of the light guide member, the second pattern including a plurality of dot-like patterns.

17. A light guide member for guiding light, the light guide member comprising:

a first pattern on a first side of the light guide member, the first pattern including:

a plurality of first features extending along a first direction;

a plurality of second features extending along a second direction;

a second pattern on the first side of the light guide member, the second pattern including a plurality of dot-like patterns, wherein:

the first direction crosses the second direction, the first feature has a first feature size, the second feature has a second feature size, and the first feature size is less than the second feature size, and the first pattern is formed on a first area of the first side of the light guide member and the second pattern is formed on a second area of the first side of the light guide member, the first area being different from the second area.

18. The light guide member as claimed in claim 17, wherein the second area is about 2% to about 4% of an entire area of the first side.

19. The light guide member as claimed in claim 17, wherein a diameter of the dot-like patterns is about 40 μm to about 50 μm.

20. The light guide member as claimed in claim 17, wherein the dot-like patterns are engraved patterns formed on the second area of the first side.

21. The light guide member as claimed in claim 17, wherein the dot-like patterns are projections formed on the second area of the first side.

* * * * *